Aug. 27, 1946.    A. F. GAMBITTA    2,406,676
CABLE JOINT
Filed Aug. 15, 1944    2 Sheets-Sheet 1
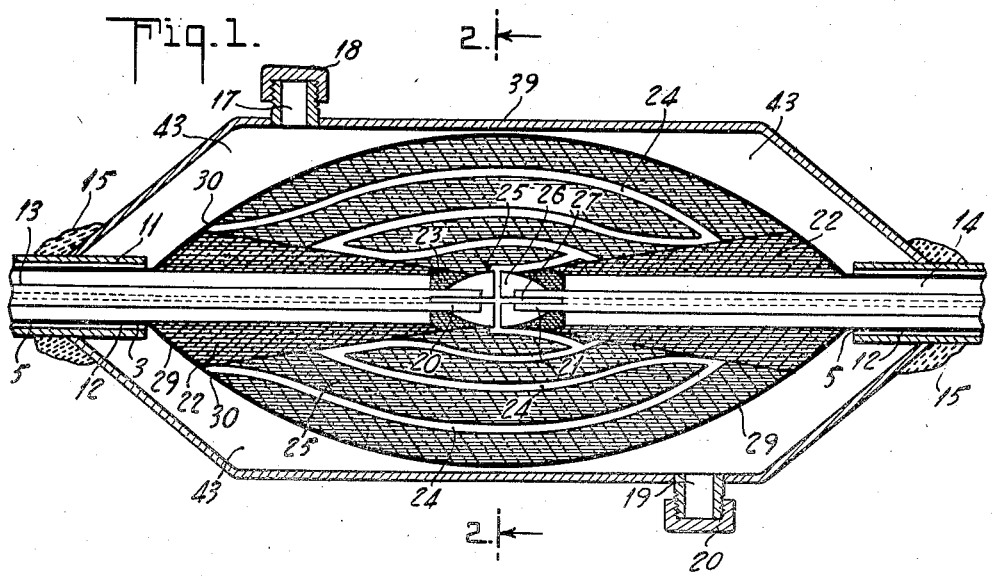
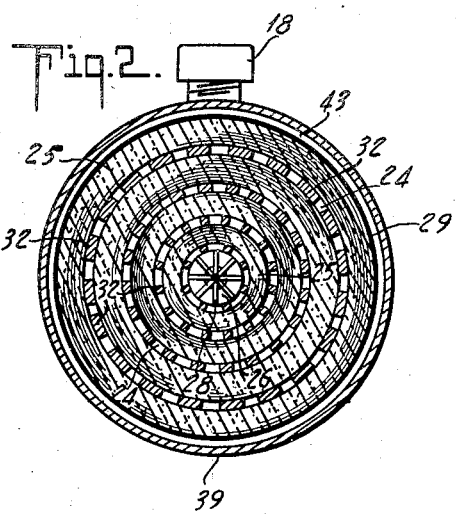
INVENTOR
ALFRED FILADELFIO GAMBITTA
ATTORNEY Aug. 27, 1946.   A. F. GAMBITTA   2,406,676
CABLE JOINT
Filed Aug. 15, 1944   2 Sheets-Sheet 2
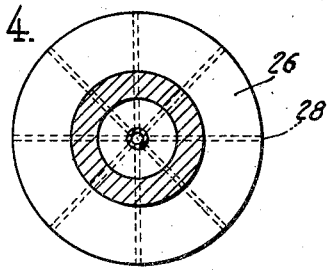
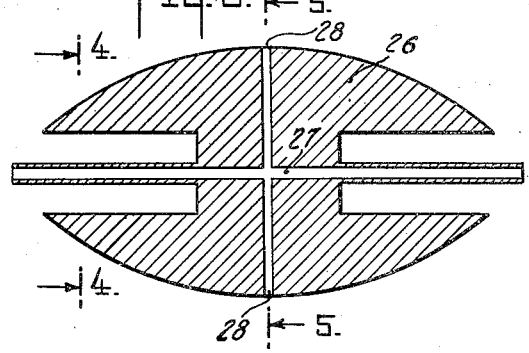
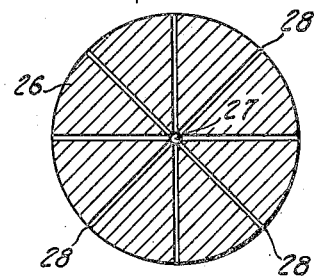
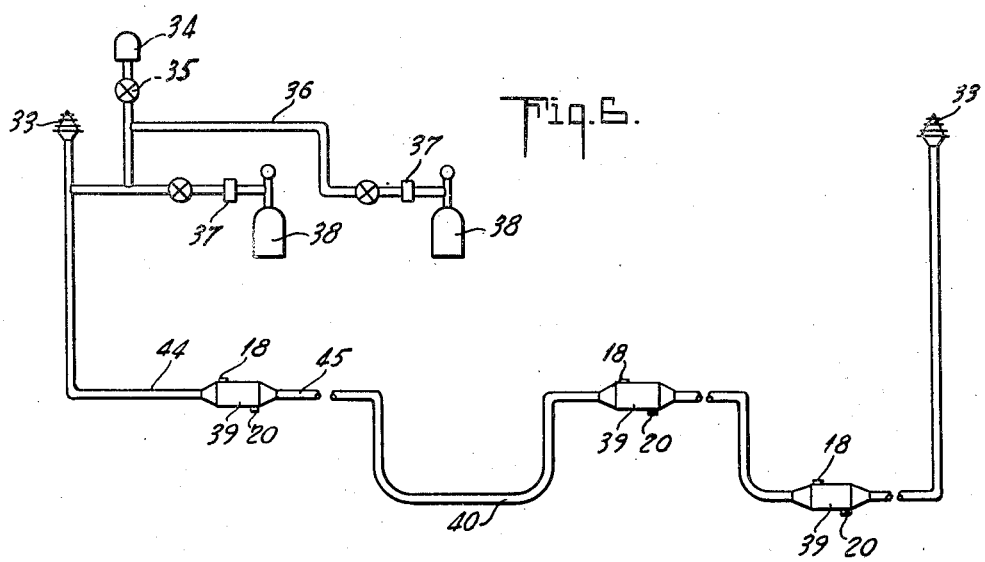
INVENTOR
ALFRED FILADELFIO GAMBITTA Patented Aug. 27, 1946

2,406,676

UNITED STATES PATENT OFFICE 2,406,676

CABLE JOINT

Alfred Filadelfio Gambitta, Jersey City, N. J., assignor to Phelps Dodge Copper Products Corporation, Dover, Del., a corporation of Delaware Application August 15, 1944, Serial No. 549,591

6 Claims. (Cl. 174—21)

My invention relates to improvements in cable joints, more particularly to joints for connecting together two lengths of gas filled cables of the single conductor type having a gas supply channel within its electrostatic field.

Where single conductor gas filled cables having a central gas supply channel are joined together, it is necessary to provide a joint that will provide a convenient means for continuing the gas feeding channel through the insulation of the joint, and has for its object to provide a structure that will present a symmetrical distribution of the stress by utilizing a plurality of gas channels within the insulation symmetrically disposed around the central axis of the joint, each channel forming a tortuous path substantially in a plane passing through the central longitudinal axis of the joint.

A further object is to provide an increase in length of the path of the gas channel from the center of the joint to the outer case thereby reducing gradually the drop in electrical stress, as the gas passes from the center of the electrical field to the casing surrounding the joint, which is at ground potential.

A further object of the invention is to provide an improved cable joint construction of the single conductor type having passage means in the body of the splice for connecting the center hollow core of the cable conductor ends joined, to the space between the outer surface of the wrapped insulation of the joint and the inner surface of the joint casing and yet obtaining the desirable high dielectric strength of the splice. It is readily seen that such improved cable joint design could be used with advantage as a feeder joint; that is, insulating oil or gas as the case may be could be fed into the cable system from any of its joints by means of attaching an oil or gas reservoir to the joint casing.

The foregoing and other features of my invention will now be described in connection with the accompanying drawings forming part of this specification in which I have represented my cable joint in its preferred form, after which I shall point out in the claims those features which I believe to be new and of my own invention.

Figure 1 is a longitudinal cross-section of my cable joint in its preferred form.

Figure 2 is a cross-section along the line 2—2, Figure 1.

Figure 3 is an enlarged longitudinal cross-section of the connector which I employ.

Figure 4 is a cross-section of the connector along the line 4—4, Figure 3.

Figure 5 is a cross-section of the connector along the line 5—5, Figure 3.

Figure 6 is a diagrammatic sketch of the cable system in which my cable joint is used showing three of the joints in the line.

My cable joint is used to connect two sections of gas filled cables of the single conductor type having a gas delivery pipe within the electrostatic field.

A successful joint of this character must not only provide for a continuous and uninterrupted passage through the joint connecting the gas delivery pipes in each section to be spliced, but it must also provide a long continuous and uninterrupted passage from the gas delivery pipe to the space between the insulation and the casing covering the joint.

In the carrying out of my invention I join two ends 13 and 14 of a hollow core gas filled cable together, as shown. The lead sheath 11 and the gas passages 12 underneath the sheath 11 are cut back as shown. The conductors 20 and 21, are connected together by a connector 26 as shown in Figure 1 by soldering or pressing in accordance with present standard practice.

The gas feeding pipe of each cable length is connected to each end of the central channel 27 so that gas passage is continuous through the joint. The small spaces between the connector and the factory applied insulation of the cable are filled with wrappings of insulation 23, the electrostatic shield 3 over the exposed cable insulation of the two cable ends is removed up to a point close to the lead sheath ends and an oil presaturated paper roll 22 is wrapped tightly over the insulation of each cable end, the paper roll being of such shape that when wrapped its outer contour is substantially as shown in Figure 1.

Over the circumferential surface of connector 26 and paper roll 22 are placed a number of insulated strips 32 as shown in Figure 2, the space between two consecutive strips forming gas channels 24 in communication with one of the radial gas channels 28 of the connector, these strips to be of any desired length in accordance to the radial and longitudinal electric stress distribution desired for any particular voltage rating of the joint. Over the insulating strips 32, the connector 26 and the paper roll 22 is wrapped the first layer of substantially dry taped insulation 25 up to a desired diameter and contour as generally shown in Figures 1 and 2. Over this wrapped insulation and partially over the paper roll are placed another desired number of insulated strips 32 of any desired length forming gas channels 24 in communication with the previous said gas channels 24 and over these strips and partially over the paper roll is wrapped the second layer of substantially dry taped insulation 25 up to a desired diameter and contour as generally shown in Figures 1 and 2. A sequence of applying insulated strips 32 and layers of substantially dry taped insulation as previously applied is now performed up to a desired overall diameter and contour as generally shown in Figures 1 and 2 with the ends of the last series of strips terminating at point 30 where the gas channels 24 also terminate and communicate with the gas space 43 inside the joint casing. A metallic tape 29 is wrapped over the outer surface of the joint insulation and electrically connected to shielding tape 3. When desirable the continuity of electrostatic shield 29 over the entire surface of the joint insulation may be broken by means of either leaving a circumferential gap preferably at the center surface of the joint where its diameter is maximum or by overlapping the center portion of the two halves of electrostatic shield of the joint with several layers of insulation between the two center portions. When the breaking of the continuity of electrostatic shield 29 is desirable, the continuity of the cable lead sheath must be broken also usually by means of a sheath insulator (not shown) either on the joint casing or on the cable sheath.

The cable splice is then enclosed in a joint casing 39 with solder wipes 15 according to present practice and having openings 17 and 19 with closures 18 and 20 respectively. The gas channels 5, of each cable length are left opened and in communication with the internal space 43 of the joint casing.

It will be readily understood that the series of very small gas channels 24 constructed in the body of the joint insulation in a "zig zag" configuration or tortuous path as shown in Figures 1 and 2, are not only adequate for a gas passage connecting the center solid wall gas channels of the jointed cable lengths to the space 43 inside the joint casing and, therefore, to the gas channels underneath the cable sheaths of the jointed cable lengths, but also with their long length, small size and configuration impart to the joint a desirable high dielectric strength even when the gas pressure falls to low values as for instance in the case of a large gas leak in the cable system.

It will be noticed that these gas channels 24 are symmetrically arranged about the central longitudinal axis of the joint and that each channel in its tortuous path lies substantially in a plane passing through the central longitudinal axis.

While I have illustrated in Figure 1 a cable joint construction made with parts and number of such parts considered as the most desirable, it should be well understood that those specified parts and number of parts could be somewhat changed without departing fundamentally from the cable joint construction made according to my invention, for instance the aforesaid insulating strips 32 which I specified in order to obtain the series of very small gas channels 24 in the body of the joint insulation in a "zig zag" configuration could be made in any other form, manner, length, number, etc., as long as their use in the body of a cable joint insulation result in the formation of long gas channels within the body of the joint insulation in a "zig zag" configuration connecting the center solid wall gas channels of the jointed cable lengths to the inner space of the joint casing.

Referring more specifically to Figure 6 which illustrates the practical application of the improvement of a gas filled cable system of the single conductor type constructed with parts thereof according to my invention, 33 indicates the cable pothead which is filled and maintained filled with a neutral gas, such as nitrogen, under positive pressure as likewise are the cables and joint casings, 44 and 45 two lengths or sections of cable spliced together, 39 the casings of the joints between length or sections, 40 the dips or low points in the cable more readily susceptible to the formation of slugs of compound, 34, 35, 36, 37 and 38 are the gas feeding equipment used at one or both cable terminal ends consisting of an alarm pressure relay 34, which gives an indication when the pressure falls below a certain minimum or increases above a desired maximum, valves 35, pressure regulators 37, nitrogen gas cylinders 38, and metal tubing 36.

It is readily seen that a gas-filled cable system of the single conductor type made with parts thereof according to my invention is an improved practical system which does not require any exterior means to be connected to the joint casings in order to obtain the fundamental requirement of having the same gas pressure within the cable system at all points and at all times during operation under load cycles regardless of any slugs of compound which may form at any point in the cable system and particularly at points 40.

I claim:

1. A cable joint for joining together two lengths of single conductor cables having a central fluid supply channel in combination, a connector provided with a central longitudinal channel adapted for connection to the central fluid supply channel of the cable lengths to be spliced, and a plurality of radial channels in the body of the connector extending from the central longitudinal channel through the connector, a wrapped insulation over the connector provided with a plurality of channels formed between a plurality of strips spaced around the longitudinal axis of the joint during the wrapping of the insulation, said channels having a tortuous path extending from the center of the joint outward, each path lying substantially in a plane passing through the longitudinal axis of the joint, the said tortuous channels connecting the radial channels with the outside of the insulation.

2. A cable joint for joining together two lengths of single conductor cables having a central fluid supply channel in combination, a connector provided with a central longitudinal channel adapted for connection to the central fluid supply channel of the cable lengths to be spliced, and a plurality of radial channels in the body of the connector extending from the central longitudinal channel through the connector, wrapped insulation over the connector provided with a plurality of channels formed between a plurality of spacer strips arranged around the longitudinal axis of the joint during the wrapping of the insulation, said channels having a tortuous path extending from the center of the joint outward, each path lying substantially in a plane passing through the longitudinal axis of the joint, the said tortuous channels connecting the radial channels with the outside of the insulation, a joint casing sealed at the ends to adjacent sheaths for connecting them and enclosing the joint between the conductors.

3. A cable joint of the class described in combination, two lengths of cables to be spliced, each having a central longitudinal gas supply channel, insulation and sheath, a connector for splicing the conductors, having a central longitudinal channel extending through its length adapted to connect the central longitudinal gas supply channel of each length of cable to be spliced and a plurality of channels through the body of the connector extending outwardly from the central longitudinal channel, wrapped insulation over the connector having a plurality of channels formed between a plurality of strips arranged around the longitudinal axis of the joint during the wrapping of the joint; said channels forming a tortuous path from the ends of the connector channels to the outside of the insulation, each path being substantially in a plane passing through the axis of the joint, a casing sealed at the ends to the sheaths of the adjacent lengths of cable and covering the joint between the conductors.

4. The device of claim 3 in which the insulation of the joint consists of a wrapped permeable insulation impregnated with a compound, the tortuous channels being formed within the wrappings by inclusion of longitudinally laid spacers during the wrapping.

5. An electric cable joint of the single conductor type consisting of a connector for splicing the conductors having a center longitudinal channel through its length and radial channels in the body of the connector which are in communication with the aforesaid center longitudinal channel, a body of wrapped insulation over the connector, the exposed cable conductors and the factory applied insulation of the cable ends, a series of small channels formed between a plurality of substantially parallel strips arranged in layers around the longitudinal axis of the joint during the wrapping of the insulation, said layers connected to form a "zigzag" configuration which connect the aforesaid radial channels in the body of the connector to the inner space of the joint casing, an electrostatic shield over the outer surface of the aforesaid body of insulation, a joint casing sealed at its ends to adjacent sheaths for connecting them and enclosing the joint between the conductors.

6. A cable joint for joining together two lengths of conductor cable each having a central solid wall gas supply channel and longitudinal channels underneath the cable sheath in combination, a connector for splicing the conductors having a center longitudinal channel through its length and radial channels in the body of the connector which are in communication with the aforesaid center longitudinal channel of the connector, a body of insulation over the spliced conductors, a series of small channels in the aforesaid body of insulation in a "zigzag" configuration connecting the aforesaid radial channels in the body of the connector to the inner space of a joint casing, an electrostatic shield over the outer surface of the joint insulation, the joint casing sealed at its ends to adjacent sheaths for connecting them and enclosing the joint between the conductors, the aforesaid central solid wall gas supply channels of the jointed cable lengths being connected together through the aforesaid center longitudinal channel of the connector and through the radial channels in the body of the connector and the small channels constructed in the body of the joint insulation being in communication with the inner space of the joint casing, the aforesaid longitudinal channels underneath the cable sheath being communication with the inner space of the joint casing at the opposite ends of the jointed cable lengths, the center solid wall gas channel of the jointed cable lengths being kept full of insulating gas under a desired pressure to supply gas to to joint casing and through it to the longitudinal channels underneath the cable sheath of the jointed lengths of cable and maintaining same under positive pressure.

ALFRED FILADELFIO GAMBITTA.